(12) United States Patent
Yamada et al.

(10) Patent No.: US 11,860,779 B2
(45) Date of Patent: Jan. 2, 2024

(54) ONBOARD RELAY DEVICE, ONBOARD RELAY METHOD, AND NON-TRANSITORY RECORDING MEDIUM

(71) Applicant: TOYOTA JIDOSHA KABUSHIKI KAISHA, Toyota (JP)

(72) Inventors: Akiyoshi Yamada, Toyota (JP); Masatoshi Ishino, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 17/525,556

(22) Filed: Nov. 12, 2021

(65) Prior Publication Data

US 2022/0147454 A1  May 12, 2022

(30) Foreign Application Priority Data

Nov. 12, 2020  (JP) ................... 2020-188876

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
None
See application file for complete search history.

(56) References Cited

U.S. PATENT DOCUMENTS

| 2013/0261878 | A1* | 10/2013 | Fukuta | G06F 17/00 |
| | | | | 701/31.4 |
| 2017/0075678 | A1* | 3/2017 | Kurosawa | H04W 4/00 |
| 2017/0169623 | A1* | 6/2017 | Chen | G07C 5/02 |
| 2019/0052522 | A1* | 2/2019 | Makkiya | H04L 41/069 |
| 2021/0216445 | A1* | 7/2021 | Rohleder | G06F 12/0875 |

FOREIGN PATENT DOCUMENTS

| JP | 2012-048489 A | 3/2012 |
| JP | 2013-203236 A | 10/2013 |
| JP | 2017-106911 A | 6/2017 |

* cited by examiner

*Primary Examiner* — Tracy C Chan
(74) *Attorney, Agent, or Firm* — Oliff PLC

(57) ABSTRACT

An onboard relay device comprises memory and a processor connected to the memory. The processor is configured to receive a data transmission request from a request originator, determine whether received data that is data received from a transmission originator is variable data or fixed data, record the received data in a cache memory section temporarily in cases in which the received data is the fixed data, determine whether or not transmission request data that is data subject to a transmission request from the request originator is recorded in the cache memory section, and in cases in which the processor has determined the transmission request data to be the received data recorded in the cache memory section, transmit the received data recorded in the cache memory section to the request originator as the transmission request data.

10 Claims, 10 Drawing Sheets

FIG.6

| ID | DATA | ATTRIBUTE | GENERATING ENTITY |
|---|---|---|---|
| 100 | VEHICLE SPEED INFORMATION | VARIABLE | FIRST ECU |
| 110 | IMAGE INFORMATION | VARIABLE | SECOND ECU |
| 120 | INTER-VEHICLE DISTANCE INFORMATION | VARIABLE | SECOND ECU |
| 130 | NUMBER OF OCCUPANT INFORMATION | VARIABLE | SECOND ECU |
| 140 | SHIFT POSITION INFORMATION | VARIABLE | THIRD ECU |
| 150 | POSITION INFORMATION | VARIABLE | FOURTH ECU |
| 160 | PERSONAL INFORMATION | FIXED | FOURTH ECU |
| 170 | CONGESTION INFORMATION | VARIABLE | FOURTH ECU |
| 180 | SPEED LIMIT INFORMATION | VARIABLE | FOURTH ECU |
| ... | ... | ... | ... |

| ID | DATA | THRESHOLD |
|---|---|---|
| 100 | VEHICLE SPEED INFORMATION | A |
| 110 | IMAGE INFORMATION | B |
| 120 | INTER-VEHICLE DISTANCE INFORMATION | C |
| 130 | NUMBER OF OCCUPANT INFORMATION | D |
| 140 | SHIFT POSITION INFORMATION | E |
| 150 | POSITION INFORMATION | F |
| 170 | CONGESTION INFORMATION | G |
| 180 | SPEED LIMIT INFORMATION | H |
| ... | ... | ... |

| FRAME TYPE<br>VEHICLE STATE / VEHICLE PERIPHERAL ENVIRONMENT | ID: 130 | ID: 140 | ID: 170 |
|---|---|---|---|
| TRAVELING ON GENERAL ROAD | NOT SATISFIED | NOT SATISFIED | (SKIP) |
| TRAVELING AT HIGH SPEED ON UNCONGESTED EXPRESSWAY | SATISFIED | SATISFIED | (SKIP) |
| DAYTIME | (SKIP) | (SKIP) | NOT SATISFIED |
| NIGHTTIME | (SKIP) | (SKIP) | SATISFIED |

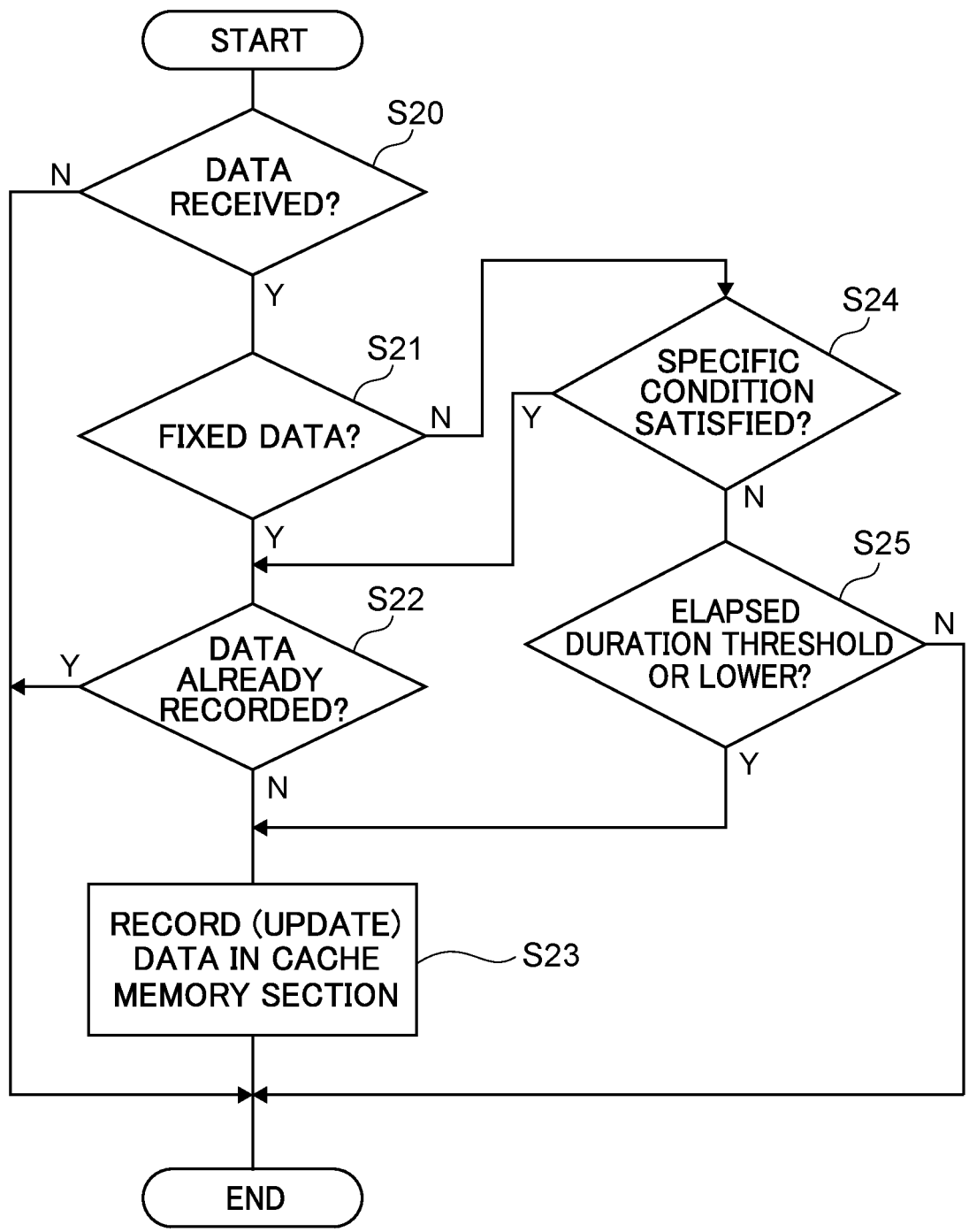

ONBOARD RELAY DEVICE, ONBOARD RELAY METHOD, AND NON-TRANSITORY RECORDING MEDIUM

CROSS-REFERENCE TO RELATED APPLICATION

This application is based on and claims priority under 35 USC 119 from Japanese Patent Application No. 2020-188876 filed on Nov. 12, 2020, the disclosure of which is incorporated by reference herein.

BACKGROUND

Technical Field

The present disclosure relates to an onboard relay device, an onboard relay method, and a non-transitory recording medium.

Related Art

Japanese Patent Application Laid-Open (JP-A) No. 2012-048489 discloses a vehicle that is capable of communicating with another vehicle and with an external server. The vehicle includes a cache memory for temporarily recording data. For example, another vehicle is capable of acquiring data temporarily recorded in the cache memory through communication.

Additional application software ("application software" will be shortened to "application" hereafter in the present specification) may be installed in a control device of the vehicle. Such installation of additional applications has a tendency to increase the communication traffic volume over an in-vehicle network.

The technical concept of JP-A No. 2012-048489 may be applied to an in-vehicle network in which applications is installed additionally. Namely, a control device may be provided with cache memory.

In such cases, applications that need to acquire data recorded in the cache memory acquire this data by accessing the cache memory rather than by communicating with an ECU connected to the control device. The communication traffic volume between the applications and the ECU is thus reduced, thereby suppressing any increase in the communication traffic volume over the in-vehicle network.

The data recorded in the cache memory of the control device may no longer have a utility value when a long duration has elapsed since a generation time of the data. Recording various data in the cache memory irrespective of the characteristics of the data may cause applications accessing the cache memory to acquire data that does not have a utility value.

SUMMARY

In consideration of the above circumstances, an object of the present disclosure is to obtain an onboard relay device, an onboard relay method, and a non-transitory recording medium capable of eliminating the chance of a data request originator acquiring data that does not have a utility value from a cache memory section, and of suppressing an increase in a communication traffic volume between the data request originator and a transmission originator.

An onboard vehicle relay device according to a first aspect of the present disclosure includes memory, and a processor coupled to the memory. The processor is configured to: receive a data transmission request from a request originator that is at least one of one or more ECUs or one or more application software; determine whether received data, which is data received from a transmission originator that is at least one ECU other than the request originator, is variable data or fixed data, wherein the variable data is data expressing a variable value with content that changes over time, and the fixed data is data expressing a fixed value with content that does not change over time; temporarily record the received data in a cache memory section in cases in which the received data is the fixed data; determine whether or not transmission request data, which is data subject to a transmission request from the request originator, is recorded in the cache memory section; and in cases in which the processor has determined the transmission request data to be the received data recorded in the cache memory section, transmit the received data recorded in the cache memory section to the request originator as the transmission request data.

The onboard relay device according to the first aspect of the present disclosure includes the cache memory section that temporarily records the received data being fixed data. For example, in some cases, the transmission request data that is data subject to the transmission request from the request originator is received data (fixed data) recorded in cache memory. In such cases, the request originator accesses the cache memory to acquire the received data, rather than communicating with the transmission originator of the transmission request data. An increase in communication traffic volume between the request originator and the transmission originator is thereby suppressed.

Furthermore, the processor of the onboard relay device according to the first aspect of the present disclosure determines whether the received data is either variable data that is data expressing a variable value with content that changes over time, or fixed data that is data expressing a fixed with content that does not change over time. The cache memory section temporarily records the received data being fixed data. Thus, the request originator does not acquire, from the cache memory, variable data having a long elapsed duration and no utility value. This enables the chance of the request originator acquiring data that does not have a utility value from the cache memory section to be eliminated.

An onboard relay device according to a second aspect of the present disclosure includes the processer in the first aspect, wherein the processor is configured to determine whether or not a specific condition is satisfied, the specific condition being satisfied in a case in which a predetermined combination has occurred between at least one of a vehicle state or a vehicle peripheral environment and a type of target data, the target data being the transmission request data comprising the variable data. The processor is configured to cause the target data to be temporarily recorded in the cache memory section in cases in which determination is made that the specific condition is satisfied.

In the second aspect of the present disclosure, the processor determines whether or not the specific condition is satisfied. The specific condition relating to the target data is satisfied in a case in which the predetermined combination has occurred between at least one of the vehicle state or the vehicle peripheral environment and a type of target data, the target data being the transmission request data comprising the variable data. Under a predetermined condition, target data with a long elapsed duration sometimes has a utility value. Namely, in cases in which the specific condition is satisfied, the target data has a utility value, even with a long elapsed duration. On the other hand, in cases in which the specific condition is not satisfied, target data with a long elapsed duration no longer has a utility value. In the second aspect, the target data is temporarily recorded in the cache memory section in cases in which the processor determines the specific condition to be satisfied. This enables the chance of the request originator acquiring data that does not have a utility value from the cache memory section to be eliminated.

An onboard relay device according to a third aspect of the present disclosure includes the processor in the second aspect, wherein the processor is configured to determine whether or not an elapsed duration, which is a duration from a generation time of the target data to a current time, is a predetermined threshold or lower in cases in which determination is made that the specific condition is not satisfied. The processor is configured to cause the target data to be temporarily recorded in the cache memory section in cases in which determination is made that the elapsed duration is the threshold or lower.

In the third aspect of the present disclosure, the processor determines whether or not the elapsed duration, which is the duration from the generation time of the target data to the current time, is the predetermined threshold or lower in cases in which the processor has determined the specific condition not to be satisfied. The target data is temporarily recorded in the cache memory section in cases in which the processor has determined that the elapsed duration is the threshold or lower. This enables the chance of the request originator acquiring data that does not have a utility value from the cache memory section to be eliminated.

An onboard relay device according to a fourth aspect of the present disclosure includes the processor in the third aspect, wherein in cases in which determination is made that the elapsed duration has exceeded the threshold, the processor is configured to: receive the transmission request data from the transmission originator; and transmit the received transmission request data to the request originator.

In the fourth aspect of the present disclosure, the request originator is able to receive transmission request data that is variable data with a short elapsed duration and has a utility value.

An onboard relay device according to a fifth aspect of the present disclosure includes the processor in the second aspect, wherein the processor is configured to transmit the target data recorded in the cache memory section to the request originator as the transmission request data in cases in which determination is made that the specific condition is satisfied.

In the fifth aspect of the present disclosure, the processor transmits the target data recorded in the cache memory section to the request originator as the transmission request data in cases in which the processor has determined the specific condition to be satisfied. As described above, in cases in which the specific condition is satisfied, the target data has a utility value, even with a long elapsed duration. The request originator is therefore able to acquire data that has a utility value from the cache memory section. This further suppresses an increase in the communication traffic volume between the request originator and the transmission originator.

An onboard relay device according to a sixth aspect of the present disclosure includes the processor in the second aspect, wherein the processor is configured to determine the specific condition to be satisfied for the target data, which is predetermined, in cases in which a vehicle is executing predetermined driving support control.

In the sixth aspect of the present disclosure, the processor determines the specific condition to be satisfied for the target data, which is predetermined, in cases in which the vehicle is executing predetermined driving support control. As described above, in cases in which the specific condition is satisfied, the target data has a utility value, even with a long elapsed duration. This enables the chance of the request originator acquiring data that does not have a utility value from the cache memory section to be eliminated in cases in which the vehicle is executing the predetermined driving support control. This further suppresses an increase in the communication traffic volume between the request originator and the transmission originator.

An onboard relay device according to a seventh aspect of the present disclosure includes the processor in the second aspect, wherein the processor is configured to determine the specific condition to be satisfied for the target data, which is predetermined, in cases in which a vehicle is traveling in a predetermined time period.

In the seventh aspect of the present disclosure, the processor determines the specific condition to be satisfied for the target data, which is predetermined, in cases in which the vehicle is traveling in the predetermined time period. As described above, in cases in which the specific condition is satisfied, the target data has a utility value, even with a long elapsed duration. This enables the chance of the request originator acquiring data that does not have a utility value from the cache memory section to be eliminated in cases in which the vehicle is traveling in the predetermined time period. This further suppresses an increase in the communication traffic volume between the request originator and the transmission originator.

An onboard relay device according to an eighth aspect of the present disclosure includes the processor in the second aspect, wherein the processor is configured to determine the specific condition to be satisfied for the target data, which is predetermined, in cases in which a vehicle is traveling at high speed on an uncongested expressway.

In the eighth aspect of the present disclosure, the processor determines the specific condition to be satisfied for the target data, which is predetermined, in cases in which the vehicle is traveling at high speed on an uncongested expressway. As described above, in cases in which the specific condition is satisfied, the target data has a utility value, even with a long elapsed duration. This enables the chance of the request originator acquiring data that does not have a utility value from the cache memory section to be eliminated in cases in which the vehicle is traveling at high speed on an uncongested expressway. This further suppresses an increase in the communication traffic volume between the request originator and the transmission originator.

Advantageous Effects of Invention

As described above, the onboard relay device, the onboard relay method, and the non-transitory recording medium according to the present disclosure exhibit advantageous effects of eliminating the chance of the data request originator acquiring data that does not have a utility value from the cache memory section, and of enabling an increase in the communication traffic volume between the data request originator and the transmission originator to be suppressed.

BRIEF DESCRIPTION OF THE DRAWINGS

Exemplary embodiments of the present invention will be described in detail based on the following figures, wherein:

FIG. 6 is a diagram illustrating a frame list recorded in a ROM of the onboard relay device illustrated in FIG. 1;

FIG. 7 is a diagram illustrating a one-dimensional map expressing relationships between types of the frames and thresholds, the one-dimensional map being recorded in the ROM of the onboard relay device illustrated in FIG. 1;

FIG. 8 is a diagram illustrating a two-dimensional map expressing relationships between types of the frames and specific conditions, the two-dimensional map being recorded in the ROM of the onboard relay device illustrated in FIG. 1;

FIG. 10 is a flowchart illustrating processing performed by the onboard relay device illustrated in FIG. 1.

DETAILED DESCRIPTION

First Exemplary Embodiment

Explanation follows regarding an exemplary embodiment of an onboard relay device 10, an onboard relay method, and a non-transitory recording medium according to the present disclosure, with reference to the drawings.

Figure 1:
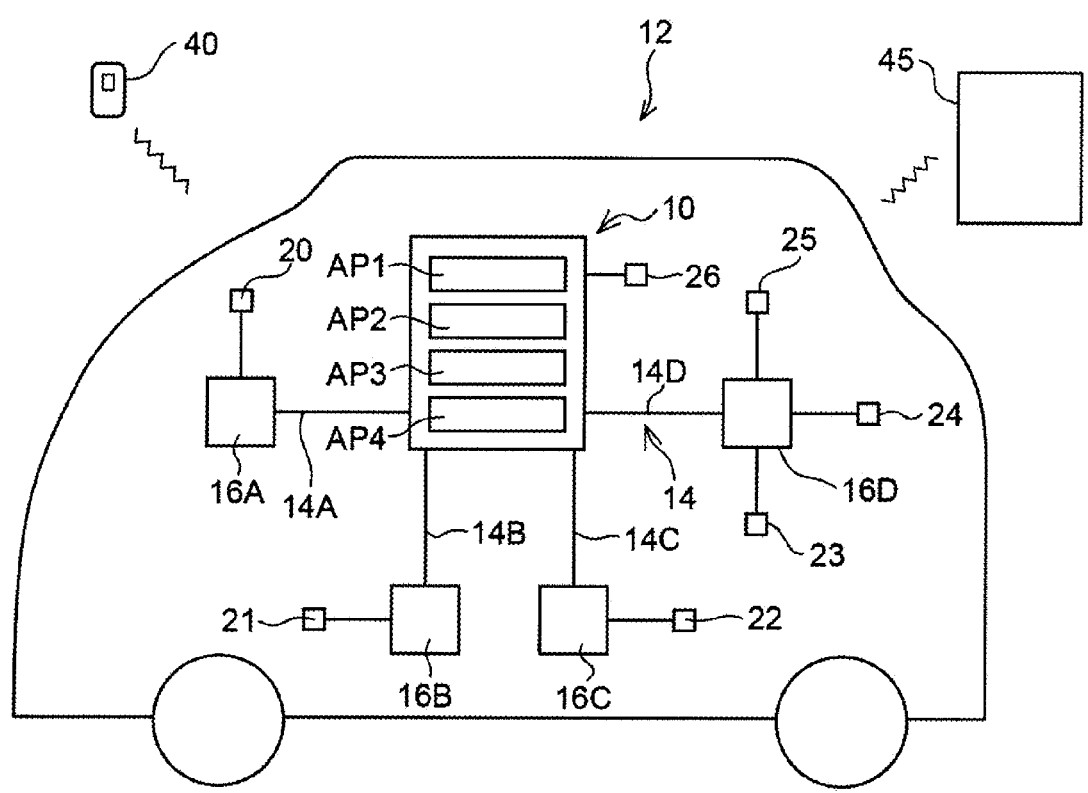
FIG. 1 is a schematic diagram illustrating a network configuration in a vehicle including an onboard relay device according to an exemplary embodiment.

FIG. 1 illustrates a vehicle 12 provided with the onboard relay device 10 of the present exemplary embodiment. The vehicle 12 includes the onboard relay device 10, an in-vehicle network 14, a first electronic control unit (ECU) 16A, a second ECU 16B, a third ECU 16C, and a fourth ECU 16D. The onboard relay device 10 includes a gateway function, and is connected to the first ECU 16A, the second ECU 16B, the third ECU 16C, and the fourth ECU 16D via the in-vehicle network 14. Specifically, the onboard relay device 10 and the first ECU 16A are connected together through a first bus 14A. The onboard relay device 10 and the second ECU 16B are connected together through a second bus 14B. The onboard relay device 10 and the third ECU 16C are connected together through a third bus 14C. The onboard relay device 10 and the fourth ECU 16D are connected together through a fourth bus 16D. The in-vehicle network 14 is for example configured by Ethernet (registered trademark), a controller area network (CAN), or Flex Ray (registered trademark).

As illustrated in FIG. 1, a vehicle wheel speed sensor 20 is connected to the first ECU 16A of the present exemplary embodiment. The vehicle wheel speed sensor 20 transmits information relating to the acquired vehicle wheel speed to the first ECU 16A at a predetermined cycle.

Cameras 21 are connected to the second ECU 16B. The cameras 21 include a peripheral camera that captures an imaging subject positioned at the periphery of (outside) the vehicle 12 and an in-vehicle camera that captures an imaging subject inside the vehicle. The respective cameras 21 transmit acquired captured data to the second ECU 16B at a predetermined cycle.

A shift position sensor 22 is connected to the third ECU 16C. The shift position sensor 22 acquires a shift position of a shift lever (not illustrated in the drawings) provided in the vehicle, and transmits acquired information regarding the shift position to the third ECU 16C at a predetermined cycle. The shift lever is, for example, capable of moving to respective shift positions corresponding to a D (drive) range, a first gear range, a second gear range, an R (reverse) range, a P (parking) range, and an N (neutral) range. Namely, the vehicle 12 is an automatic transmission vehicle (AT vehicle).

A GPS receiver 23, a display 24 (touch panel), and a wireless communication device 25 are connected to the fourth ECU 16D. The GPS receiver 23 acquires position information (for example latitude and longitude) corresponding to the travel location of the vehicle 12 at a predetermined cycle based on GPS signals transmitted from artificial satellites, and transmits the acquired position information to the fourth ECU 16D at a predetermined cycle. The display 24 includes a touch panel. The display 24 transmits information input through the touch panel to the fourth ECU 16D. For example, the touch panel is employed by a driver to input their personal information. The input personal information of the driver is recorded in ROM of the fourth ECU 16D. The wireless communication device 25 communicates wirelessly with external communication devices over the internet or the like. The wireless communication device 25 transmits information acquired by wireless communication to the fourth ECU 16D at a predetermined cycle. For example, the wireless communication device 25 is capable of communicating wirelessly with a smartphone 40 (see FIG. 1) and a roadside device 45 (see FIG. 1). For example, the wireless communication device 25 communicates wirelessly with the roadside device 45 in response to operation of the touch panel of the display 24 or the smartphone 40 by an occupant of the vehicle 12.

Figure 2:
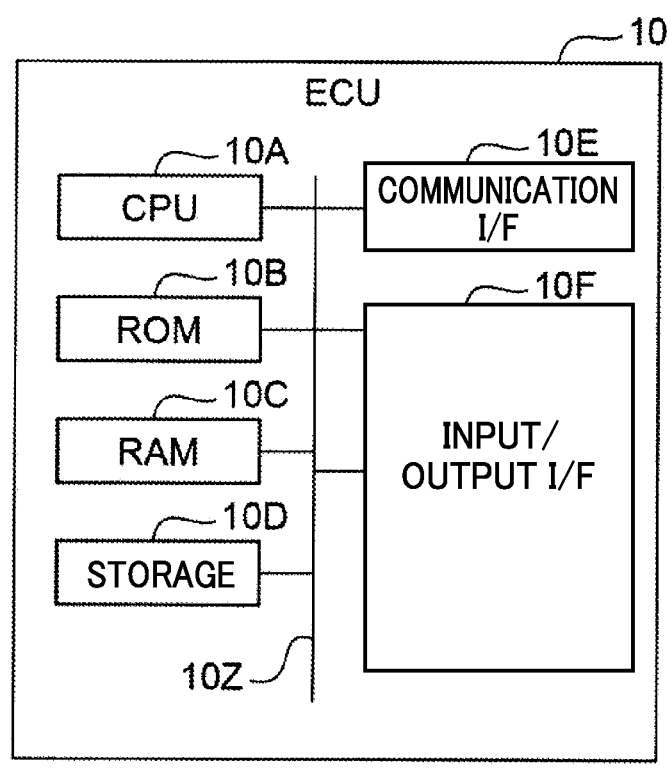
FIG. 2 is a control block diagram of the vehicle illustrated in FIG. 1.

As illustrated in FIG. 2, the onboard relay device 10 is an ECU. The onboard relay device 10 will accordingly be referred to hereafter as the relay ECU 10. The relay ECU 10 is configured to include a central processing unit (CPU; processor) (computer) 10A, a read only memory (ROM) 10B serving as a non-transitory recording medium, a random access memory (RAM) 10C serving as a non-transitory recording medium, a storage 10D serving as a non-transitory recording medium, a communication interface (I/F) 10E, and an input/output I/F 10F. The CPU 10A, the ROM 10B, the RAM 10C, the storage 10D, the communication I/F 10E, and the input/output I/F 10F are connected together through a bus 10Z so as to be capable of communicating with each other. The relay ECU 10 is capable of acquiring time-related information from a timer (not illustrated in the drawings). Note that although not illustrated in the drawings, hardware configurations of the first ECU 16A, the second ECU 16B, the third ECU 16C, and the fourth ECU 16D are the same as that of the relay ECU 10.

A driving support switch 26 is provided to a dashboard (not illustrated in the drawings) of the vehicle 12. The driving support switch 26 is connected to the relay ECU 10. Various driving support control is executed when the driving support switch 26 has been switched on by an occupant of the vehicle 12. The occupant is also able to cause the vehicle 12 to execute specific driving support control by operating the driving support switch 26. When the driving support switch 26 has been switched off by the occupant, the relay ECU 10 does not execute driving support control. For example, the relay ECU 10 executes various driving support control by operating a steering wheel, a brake pedal, an accelerator pedal, and a lever of indicator lights (none of these are illustrated in the drawings). The driving support control for example includes adaptive cruise control (ACC), lane tracing assistance (LTA) control, and lane change assistance (LCA) control.

The CPU 10A is a central processing unit that executes various programs and controls various sections. Namely, the CPU 10A reads a program from the ROM 10B or the storage 10D and executes the program using the RAM 10C as a workspace. The CPU 10A controls various configurations and performs various arithmetic processing according to the program recorded in the memory configured by the ROM 10B or the storage 10D. Namely, for example, the CPU 10A performs various arithmetic processing and controls the steering wheel, brake pedal, accelerator pedal, and the lever of indicator lights in order to execute driving support control.

The ROM 10B holds various programs and various data. For example, an operating system (OS) is installed in the ROM 10B. As illustrated in FIG. 1, various applications AP1, AP2, AP3, and AP4 are installed in the ROM 10B. The applications AP1, AP2, AP3, and AP4 are, for example, downloaded onto the ROM 10B from an external server (not illustrated in the drawings) over the internet by the wireless communication device 25 after the vehicle 12 is manufactured.

The RAM 10C serves as a workspace that temporarily stores programs and data. The storage 10D is configured by a storage device such as a hard disk drive (HDD) or a solid state drive (SSD), and holds various programs and various data. The communication I/F 10E is an interface through which the relay ECU 10 communicates with other devices. The communication I/F 10E is connected to the in-vehicle network 14. The input/output I/F 10F is an interface for communicating with various devices installed in the vehicle 12. For example, the driving support switch 26 is connected to the input/output I/F 10F of the relay ECU 10.

Figure 3:
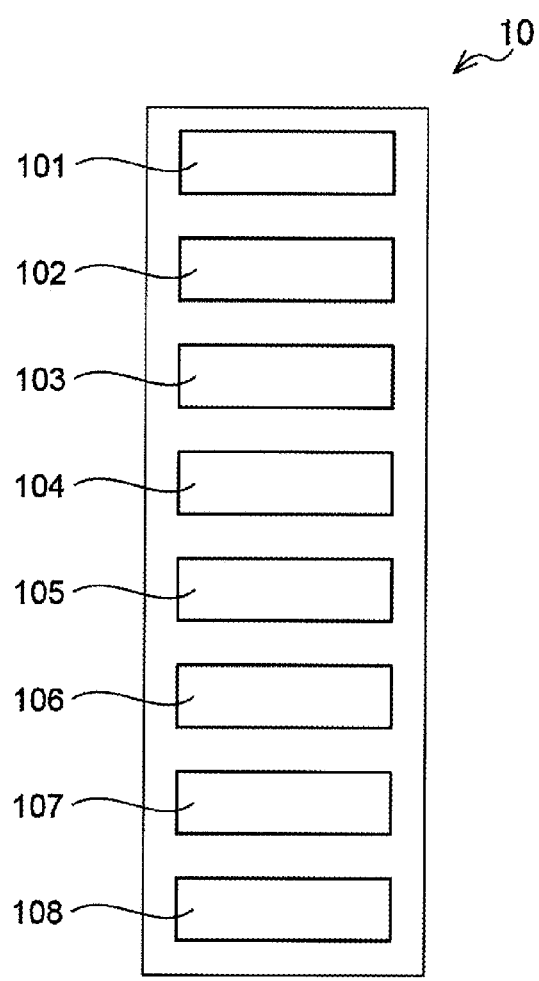
FIG. 3 is a functional block diagram illustrating the onboard relay device illustrated in FIG. 1.

FIG. 3 is a block diagram illustrating an example of functional configuration of the relay ECU 10. The functional configuration of the relay ECU 10 includes a transmission request section 101, a transmission section 102, a reception section 103, a receiving section 104, a data identification section 105, a cache memory section 106, a cache determination section 107, and a vehicle determination section 108. The transmission request section 101, the transmission section 102, the reception section 103, the receiving section 104, the data identification section 105, the cache memory section 106, the cache determination section 107, and the vehicle determination section 108 are implemented by the CPU 10A reading and executing a program stored in the ROM 10B or the storage 10D.

During execution of at least one of the application AP1, AP2, AP3, or AP4, the transmission request section 101 is capable of generating a transmission request under the control of at least one of the application AP1, AP2, AP3, or AP4. The transmission request generated by the transmission request section 101 is sent to the receiving section 104. The transmission request is a request to transmit a frame 27 (described later) generated by data generation sections 17 (described later) of the first ECU 16A, the second ECU 16B, the third ECU 16C, and the fourth ECU 16D, or a frame 27 recorded in the cache memory section 106, to the application AP1, AP2, AP3, or AP4 (RAM 10C).

The transmission section 102 transmits the transmission request generated by the transmission request section 101 and other information generated in the relay ECU 10 (for example information relating to driving support control) through at least one of the first bus 14A, the second bus 14B, the third bus 14C, or the fourth bus 14D. The transmission section 102 is also capable of transmitting the frame 27, received by the reception section 103 through at least one of the first bus 14A, the second bus 14B, the third bus 14C, or the fourth bus 14D, through a different bus (for example the second bus 14B) from the bus (for example the first bus 14A) through which the frame 27 was sent, or to the applications AP1, AP2, AP3, and AP4 (RAM 10C).

The reception section 103 is capable of receiving the frame 27 generated by at least one of the first ECU 16A, the second ECU 16B, the third ECU 16C, or the fourth ECU 16D and transmitted through at least one of the first bus 14A, the second bus 14B, the third bus 14C, or the fourth bus 14D.

The receiving section 104 is capable of receiving the transmission request transmitted from at least one of the transmission request section 101, the first ECU 16A, the second ECU 16B, the third ECU 16C, or the fourth ECU 16D.

The cache memory section 106 is capable of recording a frame 27 that satisfies a predetermined condition described later. The cache memory section 106 is configured by volatile memory. Namely, when an ignition switch of the vehicle 12 is switched from off to on, the cache memory section 106 becomes capable of recording data, and when the ignition switch is switched off, the data recorded in the cache memory section 106 is erased.

The cache determination section 107 is capable of determining whether or not transmission request data that is the frame 27 subject to the transmission request is recorded in the cache memory section 106.

The vehicle determination section 108 determines a "vehicle state" and a "vehicle peripheral environment" at the current time. The "vehicle state" includes, for example, a vehicle speed, a shift position, a driving support state, a battery status, an air conditioner status, a steering angle of the steering wheel, and an occupant state of the vehicle 12. The "occupant state" includes, for example, a total number of occupants and a driving skill level of a driver. The "vehicle peripheral environment" includes, for example, the name of the country in which the vehicle 12 is traveling, the road category (general road or expressway), a road congestion level, an inter-vehicle distance between the vehicle 12 and another vehicle positioned directly ahead of the vehicle 12, the weather, and the time period.

Figure 4:
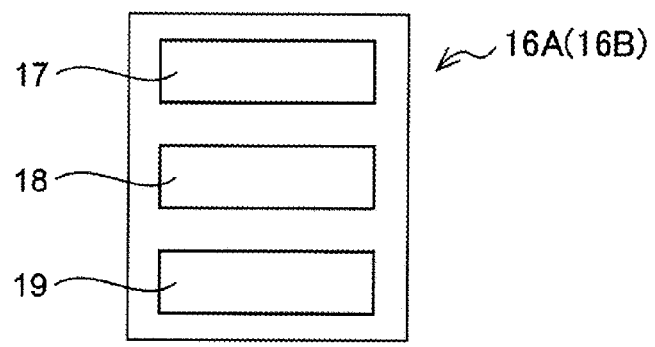
FIG. 4 is a functional block diagram of an ECU provided in the vehicle illustrated in FIG. 1.

FIG. 4 is a block diagram illustrating an example of functional configuration of the first ECU 16A, the second ECU 16B, the third ECU 16C, and the fourth ECU 16D. The respective functional configurations of the first ECU 16A, the second ECU 16B, the third ECU 16C, and the fourth ECU 16D includes the data generation section 17, a transmission section 18, and a reception section 19. The data generation section 17, the transmission section 18, and the reception section 19 are functions which are realized by processing executed by the CPUs of the first ECU 16A, the second ECU 16B, the third ECU 16C, and the fourth ECU 16D. One or more applications installed in each of the first ECU 16A, the second ECU 16B, the third ECU 16C, and the fourth ECU 16D causes these CPUs to execute this processing.

The ROM of the fourth ECU 16D is recorded with a navigation system application and information relating to traffic laws and regulations of several countries (referred to hereafter as traffic code information). The traffic code information includes, for example, information relating to speed limits. Content relating to speed limits is differentiated by country and by road category (general road or expressway).

The respective data generation sections 17 of the first ECU 16A, the second ECU 16B, the third ECU 16C, and the fourth ECU 16D are capable of generating messages using information received from at least one of the vehicle wheel speed sensor 20, the cameras 21, the shift position sensor 22, the GPS receiver 23, the display 24, or the wireless communication device 25. Each of the data generation sections 17 divides the generated message into plural segments of a predetermined size. The data generation section 17 then generates a frame 27 (see FIG. 5) including each of the divided segments so as to conform to an Ethernet protocol or the like.

Figure 5:
FIG. 5 is a diagram illustrating a frame (data) generated by the ECU illustrated in FIG. 1.

Each data generation section 17 is capable of generating various types of frame 27 (data). As illustrated in FIG. 5, each frame 27 includes an ID, this being an identifier indicating the type of frame 27. The frame 27 also includes information relating to the generation date and time of the frame 27 and information expressing the data content of the frame 27.

The ROM 10B of the relay ECU 10 is recorded with a frame list 28 (see FIG. 6). The frame list 28 represents frame 27 IDs (frame types), content and attributes of the data (information) recorded in the respective frames 27, and the entity that generated each of the frames 27.

As illustrated by the frame list 28, a frame 27 generated by the data generation section 17 of the first ECU 16A based on information transmitted from the vehicle wheel speed sensor 20 has an ID of 100, and includes vehicle speed information.

A frame 27 with an ID 110 is generated by the data generation section 17 of the second ECU 16B based on image information transmitted from the cameras 21, and includes image information (for example an image of an imaging subject peripheral to the vehicle 12).

A frame 27 with an ID 120 is generated by the data generation section 17 of the second ECU 16B based on image information transmitted from the camera 21 (peripheral camera), and includes information relating to the inter-vehicle distance between the vehicle 12 and another vehicle (not illustrated in the drawings) positioned directly ahead of the vehicle 12.

A frame 27 with an ID 130 is generated by the data generation section 17 of the second ECU 16B based on image information transmitted from the camera 21 (in-vehicle camera), and includes information relating to the number of occupants present in the vehicle 12.

A frame 27 with an ID 140 is generated by the data generation section 17 of the third ECU 16C based on information transmitted from the shift position sensor 22, and includes information relating to the shift position.

A frame 27 with an ID 150 is generated by the data generation section 17 of the fourth ECU 16D based on information transmitted from the GPS receiver 23, and includes position information of the vehicle 12.

A frame 27 with an ID 160 is generated by the data generation section 17 of the fourth ECU 16D based on information recorded in the ROM of the fourth ECU 16D, and includes personal information of a driver. This personal information includes information such as information on "driver's name", "driver's date of birth", and "driver's driving skill level".

A frame 27 with an ID 170 is generated by the data generation section 17 of the fourth ECU 16D based on information input to the fourth ECU 16D via the wireless communication device 25, and includes congestion information for the road on which the vehicle 12 is traveling.

A frame 27 with an ID 180 is generated by the data generation section 17 of the fourth ECU 16D based on traffic code information recorded in the ROM of the fourth ECU 16D, and includes information relating to a road speed limit.

The frame list 28 lists "vehicle speed information", "image information", "shift position information", "position information", "inter-vehicle distance information", "number of occupant information", "congestion information", and "speed limit information" as variable data, and lists "(driver) personal information" as fixed data. Variable data is data expressing a variable value having content that changes as time changes. Fixed data is data expressing a fixed value not changing in content as time changes. Note that data which has content that may change as time changes is treated as fixed data as long as this data is intentionally input by an occupant (human). For example, data input by the occupant using the display (touch panel) 24 or the smartphone 40 and having content that may change as time changes is fixed data. Such fixed data may include the driving skill level of the occupant, the address of the occupant, the body weight of the occupant, the telephone number of the occupant, and the email address of the occupant.

When the receiving section 104 of the relay ECU 10 has received a transmission request, the data identification section 105 of the relay ECU 10 identifies the data content, the data attribute, and the generating entity of the frame 27 subject to the transmission request based on the frame list 28 and on the ID information (of the frame 27) included in the transmission request.

The transmission section 18 of the first ECU 16A transmits the frame 27 with the ID 100 through the first bus 14A at a predetermined cycle. The transmission section 18 of the second ECU 16B transmits the frames 27 with the IDs 110, 120, and 130 through the second bus 14B when the second ECU 16B receives image data from the cameras 21. The transmission section 18 of the third ECU 16C transmits the frame 27 with the ID 140 through the third bus 14C whenever a signal has been received from the shift position sensor 22. The transmission section 18 of the fourth ECU 16D transmits the frames 27 with the IDs 150, 160, 170, and 180 through the fourth bus 14D at a predetermined cycle.

The respective transmission sections 18 of the first ECU 16A, the second ECU 16B, the third ECU 16C, and the fourth ECU 16D are capable of generating a transmission request, and are capable of transmitting the transmission request to the receiving section 104 of the relay ECU 10. A transmission request generated by the transmission section 18 is a request for the receiving section 104 of the relay ECU 10, and is made by one ECU (for example the first ECU 16A). Further, a transmission request requests the receiving section 104 to forward a frame 27 generated by another ECU (for example the second ECU 16B) to the one ECU (for example the first ECU 16A).

Each of the reception sections 19 receives information flowing through the bus connected thereto. For example, the reception section 19 of the first ECU 16A receives signals from the vehicle wheel speed sensor 20, and communication content (such as transmission requests, and frames 27 generated by other ECUs) from the relay ECU 10.

Figure 9:
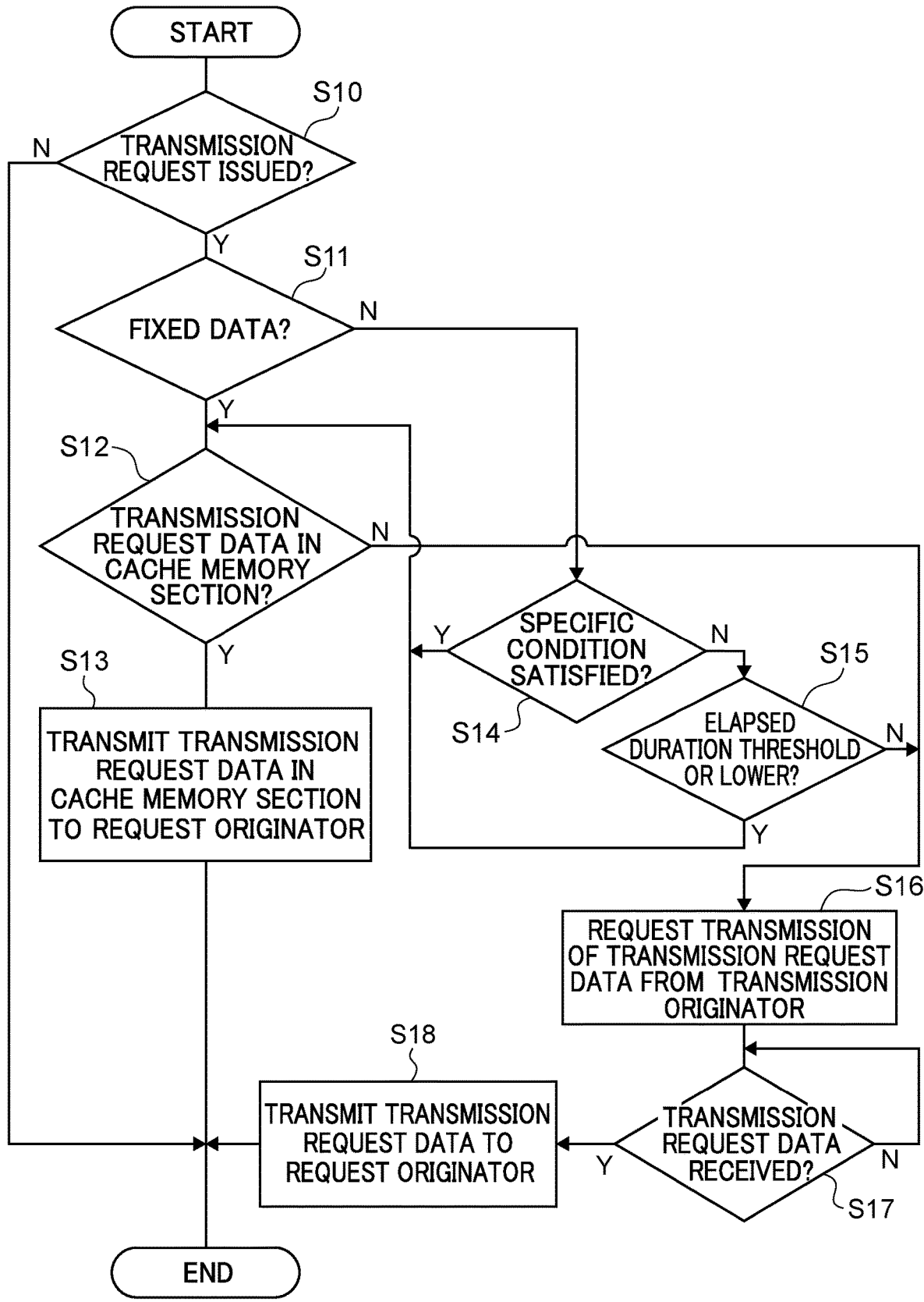
FIG. 9 is a flowchart illustrating processing performed by the onboard relay device illustrated in FIG. 1.

Next, explanation follows regarding a flow of processing performed by the relay ECU 10 of the present exemplary embodiment, with reference to the flowchart illustrated in FIG. 9. The relay ECU 10 executes the processing in the flowchart of FIG. 9 each time a predetermined duration elapses.

First, at step S10, the relay ECU 10 determines whether or not the receiving section 104 has received a transmission request from a request originator, namely at least one of the applications AP1, AP2, AP3, AP4, the first ECU 16A, the second ECU 16B, the third ECU 16C, or the fourth ECU 16D. This transmission request includes ID information of the frame 27 for which transmission is being requested.

In cases in which determination is affirmative at step S10, the relay ECU 10 proceeds to step S11. On proceeding to step S11, the data identification section 105 of the relay ECU 10 determines whether or not the frame 27 subject to the transmission request (data subject to the transmission request) is fixed data, based on the ID information included in the transmission request and the frame list 28 illustrated in FIG. 6.

In cases in which determination is affirmative at step S11, the relay ECU 10 proceeds to step S12. On proceeding to step S12, the cache determination section 107 of the relay ECU 10 refers to the ID information included in the transmission request and the ID information of the data (frames) recorded in the cache memory section 106 in order to determine whether or not the frame 27 subject to the transmission request (data subject to the transmission request) is recorded in the cache memory section 106.

In cases in which determination is affirmative at step S12, the relay ECU 10 proceeds to step S13. On proceeding to step S13, the transmission section 102 of the relay ECU 10 transmits the frame 27 subject to the transmission request (transmission request data) and recorded in the cache memory section 106 to the request originator.

On the other hand, in cases in which determination is negative at step S11, the relay ECU 10 proceeds to step S14, and the vehicle determination section 108 determines whether or not a predetermined specific condition relating to target data is satisfied, based on the target data configuring the transmission request data that is variable data, and on at least one of the vehicle state or vehicle peripheral environment. At his time, for example, the vehicle determination section 108 identifies a vehicle state based on the vehicle speed, the shift position, the driving support state, and an occupant state of the vehicle 12. The vehicle determination section 108 also identifies the vehicle peripheral environment based on for example the name of the country in which the vehicle 12 is traveling, the road category, the road congestion level, the inter-vehicle distance between the vehicle 12 and another vehicle positioned directly ahead of the vehicle 12, the weather, and the time period. The vehicle determination section 108 also refers to a two-dimensional map 32 recorded in the ROM 10B and illustrated in FIG. 8 to determine whether or not the specific condition is satisfied. As can be seen from the two-dimensional map 32, the decision as to whether or not the specific condition is satisfied is made using a combination of the target data and at least one of the vehicle state or the vehicle peripheral environment. For example, in a case in which the vehicle 12 is traveling on an expressway, a specific condition is satisfied for target data A, this being predetermined target data. On the other hand, in a case in which the vehicle 12 is traveling on an expressway, a specific condition may not be satisfied for target data B, this also being predetermined target data.

In cases in which the specific condition is satisfied, the frame 27 (target data) that is variable data has a utility value irrespective of the length of elapsed duration, namely a duration from a generation time of the frame 27 to the current time. In other words, in such cases, it is considered that the data content of the frame 27 that is variable data is substantively unchanged during this elapsed duration. Namely, in such cases, the data content of the frame 27 that is variable data either does not change at all, or only changes within a permissible range for processing by the request originator. On the other hand, in cases in which the specific condition is not satisfied, the frame 27 (target data) that is variable data with a long elapsed duration does not have a utility value. In other words, in such cases, it is considered that the data content of the frame 27 being variable data substantively changes during this elapsed duration. Namely, in such cases, the data content of the frame 27 that is variable data has changed beyond the permissible range for processing by the request originator. In cases in which the specific condition is satisfied, the relay ECU 10 makes affirmative determination at step S14 and proceeds to step S12.

On the other hand, in cases in which determination is negative at step S14, the relay ECU 10 proceeds to step S15. On proceeding to step S15, the data identification section 105 of the relay ECU 10 refers to a one-dimensional map 30 recorded in the ROM 10B and illustrated in FIG. 7. Thresholds relating to the elapsed duration, namely the duration from the generation time of the frame 27 to the current time, are set in the one-dimensional map 30 for each frame 27 type (ID). The data identification section 105 compares the elapsed duration of the frame 27 (transmission request data) that is the variable data subject to the transmission request against the threshold, based on the one-dimensional map 30 and the time when the reception section 103 received a frame 27 of the same type after the ignition switch was switched from off to on and before the current time (this time is referred to hereafter as the prior reception time). Note that the prior reception time and the generation time of the frame 27 received by the reception section 103 at the prior reception time are substantially the same. In cases in which the data identification section 105 determines the elapsed duration of the frame 27 to be the threshold or lower (step S15: YES), the relay ECU 10 proceeds to step S12. Note that in cases in which the reception section 103 has not received a frame 27 of the same type after the ignition switch has been switched from off to on, the data identification section 105 makes negative determination at step S15.

In cases in which the cache determination section 107 makes affirmative determination at step S12, at step S13, the transmission section 102 transmits the frame 27 (transmission request data) that is recorded in the cache memory section 106 and subject to the transmission request to the request originator.

On the other hand, in cases in which determination is negative at step S15 or cases in which determination is negative at step S12, the relay ECU 10 proceeds to step S16. On proceeding to step S16, the data identification section 105 of the relay ECU 10 identifies a transmission originator which is at least one of the first ECU 16A, the second ECU 16B, the third ECU 16C, or the fourth ECU 16D and is capable of generating the frame 27 (transmission request data) that is variable data subject to the transmission request, based on the frame list 28. The data identification section 105 then issues a request to the thus identified transmission originator to transmit this frame 27 to the reception section 103 of the relay ECU 10.

On completion of the processing of step S16, the relay ECU 10 proceeds to step S17. At step S17, the reception section 103 of the relay ECU 10 determines whether or not the frame 27 (transmission request data) subject to the transmission request has been received from the transmission originator.

In cases in which determination is affirmative at step S17, the relay ECU 10 proceeds to step S18. On proceeding to step S18, the transmission section 102 of the relay ECU 10 transmits the frame 27 (received data) received from the reception section 103 to the request originator. On the other hand, in cases in which determination is negative at step S17, the relay ECU 10 repeats the processing of step S17.

On completion of the processing of step S13 or step S18, or in cases in which determination is negative at step S10, the relay ECU 10 ends the current round of processing of the flowchart.

Furthermore, the relay ECU 10 executes the processing of the flowchart illustrated in FIG. 10 each time a predetermined duration elapses.

At step S20, the relay ECU 10 determines whether or not the reception section 103 has received any data (frame 27) from the transmission originator.

In cases in which determination is affirmative at step S20, the relay ECU 10 proceeds to step S21. On proceeding to step S21, the data identification section 105 of the relay ECU 10 refers to the frame list 28 to determine whether or not the received frame 27 is fixed data.

In cases in which determination is affirmative at step S21, the relay ECU 10 proceeds to step S22. At step S22, the relay ECU 10 determines whether or not this frame 27 (fixed data) has already been recorded in the cache memory section 106.

In cases in which determination is negative at step S22, the relay ECU 10 proceeds to step S23. At step S23, the cache memory section 106 of the relay ECU 10 records this frame 27 (fixed data).

On the other hand, in cases in which determination is negative at step S21, the relay ECU 10 proceeds to step S24. The processing of step S24 is the same as that of step S14.

In cases in which determination is negative at step S24, the relay ECU 10 proceeds to step S25. On proceeding to step S25, the data identification section 105 of the relay ECU 10 performs the same processing as that of step S15. In cases in which the data identification section 105 determines the elapsed duration of the frame 27 to be the threshold or lower (step S25: YES), the relay ECU 10 proceeds to step S23.

On proceeding to step S23, the cache memory section 106 of the relay ECU 10 records this frame 27 that is variable data. Note that in cases in which a frame 27 (variable data) having the same ID has already been recorded in the cache memory section 106, the content relating to this frame 27 recorded in the cache memory section 106 is updated.

On the other hand, in cases in which determination is affirmative at step S24, the relay ECU 10 proceeds to step S22.

On completion of the processing of step S23, in cases in which determination is negative at step S20 or step S25, or in cases in which determination is affirmative at step S22, the relay ECU 10 ends the current round of processing of the flowchart.

Operation and Advantageous Effects

Next, explanation follows regarding operation and advantageous effects of the present exemplary embodiment in various different cases.

Case 1A

A case is envisaged in which the transmission request section 101 issues a transmission request to the receiving section 104 under the control of the application AP1 as the request originator, and the transmission request includes ID information for the frame 27 with the ID 140 and the frame 27 with the ID 130. In this case, at step S14 in FIG. 9, the vehicle determination section 108 of the relay ECU 10 determines whether or not specific conditions relating to the frame 27 with the ID 140 and the frame 27 with the ID 130 that are the target data are satisfied, based on the two-dimensional map 32.

In this example, a case is envisaged in which the vehicle 12 is traveling on a general road. When an application of the navigation system is being executed, the vehicle determination section 108 identifies that the vehicle 12 is traveling on a general road based on the frame 27 with the ID 150 received from the fourth ECU 16D. In such a case, the vehicle determination section 108 determines the specific condition not to be satisfied based on the two-dimensional map 32. Namely, the vehicle determination section 108 makes negative determination at step S14. In this case, there is a possibility that the position of the shift lever of the vehicle 12 change in a short duration. Moreover, there is a possibility that at least one occupant of the vehicle 12 leave the vehicle 12 at a particular location on the general road. Namely, in this case, there is a possibility that the data content of the frame 27 with the ID 140 which expresses information relating to the shift position and the frame 27 with the ID 130 which expresses information relating to the number of occupants change.

Next, at step S15 in FIG. 9, the data identification section 105 of the relay ECU 10 determines whether or not the elapsed duration of the frame 27 with the ID 140 is a threshold E or lower. The data identification section 105 also determines whether or not the elapsed duration of the frame 27 with the ID 130 is a threshold D or lower. In cases in which determination is negative at step S15, these frames 27 are sent from their transmission originators, namely the second ECU 16B and the third ECU 16C, to the relay ECU 10 (step S16, step S17: YES), and the frames 27 are then transmitted to the application AP1 that is the request originator by the transmission section 102 (step S18). Note that in present specification, explanation such as "a frame is transmitted to an application that is the request originator by the transmission section" or the like is understood as meaning "the transmission section transmits a frame to RAM and notifies the application of this, and the application then accesses the RAM on receipt of the notification".

After an affirmative determination at step S17, the relay ECU 10 makes affirmative determination at step S20. The relay ECU 10 then makes negative determinations at steps S21, S24, and S25, such that these frames 27 that correspond to variable data are not recorded in the cache memory section 106.

In this case 1A, the freshly generated frames 27 that are variable data are transmitted from the second ECU 16B and the third ECU 16C to the application AP1 that is the request originator via the relay ECU 10. This enables the application AP1 to execute processing using frames 27 storing data that has a utility value.

Case 1B

A case is envisaged in which the transmission request section 101 issues a transmission request to the receiving section 104 at a predetermined first timing under the control of the application AP1 as the request originator, and this transmission request includes ID information for the frame 27 with the ID 140 and the frame 27 with the ID 130. A case is envisaged in which the vehicle 12 is traveling at a high speed (for example 80 km/h or greater) on an uncongested expressway. Moreover, a case is envisaged in which the transmission request section 101 has issued a transmission request to the receiving section 104 at a second timing earlier than the first timing under the control of the application AP2 as the request originator, and this transmission request also included ID information for the frame 27 with the ID 140 and the frame 27 with the ID 130. Furthermore, the frame 27 with the ID 140 transmitted from the third ECU 16C to the relay ECU 10 is envisaged to have been transmitted to the application AP2 and also recorded in the cache memory section 106. Moreover, it is assumed that the frame 27 with the ID 130 which was transmitted from the second ECU 16B to the relay ECU 10 is transmitted to the application AP2 and this frame 27 is recorded in the cache memory section 106.

In this case, at step S14 in FIG. 9, the vehicle determination section 108 of the relay ECU 10 determines whether or not the specific conditions relating to the frame 27 with the ID 140 and the frame 27 with the ID 130 that are the target data are satisfied based on the two-dimensional map 32. When an application of the navigation system is being executed, the vehicle determination section 108 identifies that the vehicle 12 is traveling at a high speed on an uncongested expressway based on the frame 27 with the ID 100 received from the first ECU 16A and the frame 27 with the ID 150 and the frame 27 with the ID 170 received from the fourth ECU 16D. In such a case, the vehicle determination section 108 determines the specific conditions to be satisfied based on the two-dimensional map 32. Namely, the vehicle determination section 108 makes affirmative determination at step S14. In this case, there is a high possibility that the position of the shift lever of the vehicle 12 does not move from the D range. Moreover, there is a high possibility that no occupant leaves the vehicle 12. Namely, in this case, there is a low possibility that the data content of the frame 27 with the ID 140 which expresses information relating to the shift position and the data content of the frame 27 with the ID 130 which expresses information relating to the number of occupants change.

Next, at step S12 in FIG. 9, the data identification section 105 of the relay ECU 10 determines whether or not these frames 27 have been recorded in the cache memory section 106. In this case, since these frames 27 have been recorded in the cache memory section 106 (step S12: YES), at step S13 the transmission section 102 transmits the frame 27 with the ID 140 and the frame 27 with the ID 130 recorded in the cache memory section 106 to the application AP1 that is the request originator.

In case 1B, since the application AP1 that is the request originator acquires the frame 27 with the ID 140 and the frame 27 with the ID 130 from the cache memory section 106, there is no need for communication between the second ECU 16B and the third ECU 16C and the application AP1. Accordingly, an increase in the communication traffic volume over the in-vehicle network 14 is suppressed. Moreover, considering the vehicle state and the vehicle peripheral environment, the frames 27 (variable data) recorded in the cache memory section 106 are data that has a utility value for the application AP1. The application AP1 is thus able to execute processing using frames 27 recorded with data that has a utility value.

Case 2A

A case is envisaged in which the transmission request section 101 issues a transmission request to the receiving section 104 under the control of the application AP2 as the request originator, and the transmission request includes ID information for the frame 27 with the ID 170. In this case, at step S14 in FIG. 9, the vehicle determination section 108 of the relay ECU 10 determines whether or not the specific condition relating to the frame 27 with the ID 170 that is the target data is satisfied, based on the two-dimensional map 32.

In this example, a case is envisaged in which the vehicle determination section 108 identifies the current time period to be daytime based on information relating to the current time acquired from the timer. In such a case, the vehicle determination section 108 determines the specific condition not to be satisfied based on the two-dimensional map 32. Namely, the vehicle determination section 108 makes negative determination at step S14. In this case, there is a possibility that the road congestion level where the vehicle 12 is traveling change by a large degree that exceeds a permissible range for processing by the request originator. Namely, in this case, there is a possibility that the data content of the frame 27 with the ID 170 which expresses congestion information changes.

Next, at step S15 in FIG. 9, the data identification section 105 of the relay ECU 10 determines whether or not the elapsed duration of the frame 27 with the ID 170 is a threshold G or lower. In cases in which determination is negative at step S15, the frame 27 that is variable data is sent from the transmission section 18 of the fourth ECU 16D that is the transmission originator to the reception section 103 (step S16, step S17: YES), and this frame 27 is then transmitted from the transmission section 102 to the application AP2 that is the request originator (step S18). Moreover, after affirmative determination has been made at step S17, the relay ECU 10 makes affirmative determination at step S20. The relay ECU 10 then makes negative determination at steps S21, S24, and S25, such that this frame 27 that is variable data is not recorded in the cache memory section 106.

In this case 2A, the freshly generated frame 27 that is variable data is transmitted from the fourth ECU 16D to the application AP2 that is the request originator. This enables the application AP2 to execute processing using the frame 27 recorded with data that has a utility value.

Case 2B

A case is envisaged in which the transmission request section 101 issues a transmission request to the receiving section 104 at a predetermined first timing under the control of the application AP2 as the request originator, and the transmission request includes ID information for the frame 27 with the ID 170.

In this case, at step S14 in FIG. 9, the vehicle determination section 108 of the relay ECU 10 determines whether or not the specific condition relating to the frame 27 with the ID 170 that is the target data is satisfied, based on the two-dimensional map 32. In this example, a case is envisaged in which the vehicle determination section 108 identifies the current time period to be nighttime based on the information relating to the current time acquired from the timer. In this case, the vehicle determination section 108 determines the specific condition to be satisfied based on the two-dimensional map 32. Namely, the vehicle determination section 108 makes affirmative determination at step S14. In this case, it is inferred that congestion level of a road where the vehicle 12 is traveling is highly unlikely to change by a large degree that exceeds the permissible range for processing by the request originator. Namely, it is inferred that the road will remain in an uncongested state. Namely, in this case, there is a low possibility that the data content of the frame 27 with the ID 170 which expresses information relating to congestion changes.

Next, at step S12 in FIG. 9, the data identification section 105 of the relay ECU 10 determines whether or not this frame 27 is recorded in the cache memory section 106. In this example, a case is envisaged in which this frame 27 is not recorded in the cache memory section 106 (step S12: NO). In this case, this frame 27 is sent from the fourth ECU 16D that is the transmission originator to the reception section 103 of the relay ECU 10 (step S16, step S17: YES), and this frame 27 is then transmitted to the application AP2 that is the request originator by the transmission section 102 (step S18). At a third timing later than the first timing, the relay ECU 10 makes affirmative determination at step S20, makes negative determination at step S21, makes affirmative determination at step S24, and makes negative determination at step S22. Accordingly, at step S23, this frame 27 that is variable data is recorded in the cache memory section 106.

In this case 2B, the application AP2 that is the request originator acquires the frame 27 with the ID 170 from the fourth ECU 16D. This enables the application AP2 to execute processing using the frame 27 recorded with variable data that is freshly generated and has a utility value.

Case 3A

A case is envisaged in which the transmission request section 101 issues a transmission request to the receiving section 104 under the control of the application AP3 as the request originator, and the transmission request includes ID information for the frame 27 with the ID 120. In this case, at step S14 in FIG. 9, the vehicle determination section 108 of the relay ECU 10 determines whether or not the specific condition relating to the frame 27 with the ID 120 that is the target data is satisfied, based on the two-dimensional map 32.

In this example, a case is envisaged in which the vehicle determination section 108 determines that driving support control is not being performed based on a signal transmitted from the driving support switch 26. In other words, a case is envisaged in which the vehicle determination section 108 determines the vehicle 12 to be in a normal travel mode. In this case, the vehicle determination section 108 determines the specific condition not to be satisfied based on the two-dimensional map 32. Namely, the vehicle determination section 108 makes negative determination at step S14. In this case, there is a possibility that the inter-vehicle distance between the vehicle 12 and another vehicle positioned directly ahead of the vehicle 12 changes by a large degree that exceeds a permissible range for processing by the request originator. Namely, in this case, there is a possibility that the data content of the frame 27 with the ID 120 which expresses information regarding the inter-vehicle distance changes.

Next, at step S15 in FIG. 9, the data identification section 105 of the relay ECU 10 determines whether or not the elapsed duration of the frame 27 with the ID 120 is a threshold C or lower. In this example, a case is envisaged in which determination is affirmative at step S15 and determination is negative at step S12. In such a case, the frame 27 that is variable data is sent from the second ECU 16B that is the transmission originator to the relay ECU 10 (step S16, step S17: YES), and this frame 27 is then transmitted from the transmission section 102 to the application AP3 that is the request originator (step S18). Moreover, after making affirmative determination at step S17, the relay ECU 10 makes affirmative determination at step S20. The relay ECU 10 then makes negative determination at steps S21 and S24, and makes affirmative determination at step S25. Accordingly, at step S23, this frame 27 that is variable data is recorded in the cache memory section 106.

In this case 3A, the freshly generated frame 27 that is variable data is transmitted from the second ECU 16B to the application AP3 that is the request originator. This enables the application AP3 to execute processing using the frame 27 recorded with data that has a utility value.

Case 3B

A case is envisaged in which the transmission request section 101 issues a transmission request to the receiving section 104 at a predetermined first timing under the control of the application AP3 as the request originator, and the transmission request includes ID information for the frame 27 with the ID 120. Moreover, a case is envisaged in which the transmission request section 101 has issued a transmission request to the receiving section 104 at a second timing earlier than the first timing under the control of the application AP4 as the request originator, and this transmission request also included ID information for the frame 27 with the ID 120. Furthermore, it is assumed that the frame 27 with the ID 120 which was transmitted from the second ECU 16B to the relay ECU 10 is transmitted from the transmission section 102 to the application AP4 and this frame 27 is recorded in the cache memory section 106.

In this case, at step S14 in FIG. 9, the vehicle determination section 108 of the relay ECU 10 determines whether or not the specific condition relating to the frame 27 with the ID 120 that is the target data is satisfied, based on the two-dimensional map 32. In this example, a case is envisaged in which the vehicle determination section 108 identifies that adaptive cruise control (ACC), this being one form of driving support control, is being executed based on a signal transmitted from the driving support switch 26. In this case, the vehicle determination section 108 determines the specific condition to be satisfied based on the two-dimensional map 32. Namely, the vehicle determination section 108 makes affirmative determination at step S14. In this case, since a substantially constant inter-vehicle distance is maintained between the vehicle 12 and the other vehicle, it is highly unlikely that this inter-vehicle distance will change to an extent that exceeds the permissible range for processing by the request originator. Namely, in this case, there is a low possibility that the data content of the frame 27 with the ID 120 which expresses information relating to the inter-vehicle distance changes.

Next, at step S12 in FIG. 9, the data identification section 105 of the relay ECU 10 determines whether or not this frame 27 is recorded in the cache memory section 106. In this case, since the frame 27 is recorded in the cache memory section 106 (step S12: YES), at step S13, the transmission section 102 transmits the frame 27 with the ID 120 recorded in the cache memory section 106 to the application AP3 that is the request originator.

In this case 3B, the application AP3 that is the request originator acquires the frame 27 with the ID 120 from the cache memory section 106. Accordingly, an increase in the communication traffic volume over the in-vehicle network 14 is suppressed. Moreover, considering the vehicle state and the vehicle peripheral environment, the frame 27 (variable data) recorded in the cache memory section 106 is data that has a utility value to the application AP3. The application AP3 is thus able to execute processing using the frame 27 that is recorded with data that has a utility value.

Case 4

The application AP3 compares inter-vehicle distance information obtained from the frame 27 with the ID 120 against a predetermined inter-vehicle distance threshold, and displays a warning on the display 24 if the inter-vehicle distance is an inter-vehicle distance threshold or lower. Moreover, plural inter-vehicle distance thresholds are provided according to the driving skill levels of the drivers. The application AP3 selects the inter-vehicle distance threshold corresponding to the driving skill level, and compares the selected inter-vehicle distance threshold against the inter-vehicle distance.

A case is envisaged in which the transmission request section 101 issues a transmission request to the receiving section 104 at a predetermined first timing under the control of the application AP3 as the request originator, and this transmission request includes ID information for the frame 27 with the ID 160.

Moreover, a case is envisaged in which the transmission request section 101 has issued a transmission request to the receiving section 104 at a second timing earlier than the first timing under the control of the application AP4 as the request originator, and the transmission request also included ID information for the frame 27 with the ID 160. Moreover, it is assumed that the frame 27 with the ID 160 which was transmitted from the fourth ECU 16D to the reception section 103 is transmitted from the transmission section 102 to the application AP4 and this frame 27 is recorded in the cache memory section 106.

Note that for example after the ignition switch has been switched from off to on, the in-vehicle camera of the camera 21 may capture the face of the driver each time a predetermined duration elapses, and the second ECU 16B may transmit the captured data to the relay ECU 10 each time a predetermined duration elapses. In such cases, for example, the relay ECU 10 identifies the driver based on the captured data received from the second ECU 16B at the second timing. Also at the second timing, the relay ECU 10 issues a transmission request for the frame 27 with the ID 160 which corresponds to the identified driver to the fourth ECU 16D, and causes the received frame 27 with the ID 160 to be recorded in the cache memory section 106.

Typically, the driver of the vehicle 12 does not change between a time at which the ignition switch of the vehicle 12 is switched from off to on and a time at which the ignition switch is switched from on to off. Accordingly, as illustrated in FIG. 6, the frame 27 with the ID 160 is fixed data. In such a case, the data identification section 105 of the relay ECU 10 makes affirmative determination at step S11 and step S12 in FIG. 9 at the first timing. Then, at step S13, the transmission section 102 transmits the frame 27 with the ID 160 recorded in the cache memory section 106 to the application AP3 that is the request originator.

In this case 4, the application AP3 that is the request originator acquires the frame 27 with the ID 160 from the cache memory section 106. Accordingly, an increase in the communication traffic volume over the in-vehicle network 14 is suppressed. The corresponding frame 27 recorded in the cache memory section 106 is fixed data having content that does not change as time changes. The application AP3 is thus able to execute processing using the frame 27 that stores data having a utility value.

Case 5A

A case is envisaged in which the transmission request section 101 issues a transmission request to the receiving section 104 under the control of the application AP4 as the request originator, and the transmission request includes ID information for the frame 27 with the ID 180. In this case, at step S14 in FIG. 9, the vehicle determination section 108 of the relay ECU 10 determines whether or not the specific condition relating to the frame 27 with the ID 180 that is the target data is satisfied, based on the two-dimensional map 32.

In this example, a case is envisaged in which the vehicle 12 is traveling on a road in a country that has a land border with another country and includes both general roads and expressways (this country is referred to hereafter as a specific country). When an application of the navigation system is being executed, the vehicle determination section 108 identifies that the vehicle 12 is traveling on a road in the specific country based on the frame 27 with the ID 150 received from the fourth ECU 16D. In this case, the vehicle determination section 108 determines the specific condition not to be satisfied based on the two-dimensional map 32. Namely, the vehicle determination section 108 makes negative determination at step S14. In this case, there is a possibility that the vehicle 12 moves between a general road and an expressway in the specific country, or that the vehicle 12 travels on a road in another country that borders the specific country. Namely, in this case, there is a possibility that the data content of the frame 27 with the ID 180 which expresses information relating to the speed limit changes.

Next, at step S15 in FIG. 9, the data identification section 105 of the relay ECU 10 determines whether or not the elapsed duration of the frame 27 with the ID 180 is a threshold H or lower. In cases in which determination is negative at step S15, the frame 27 that is variable data is sent from the fourth ECU 16D that is the transmission originator to the reception section 103 (step S16, step S17: YES), and this frame 27 is then transmitted from the transmission section 102 to the application AP4 that is the request originator (step S18). Moreover, after affirmative determination has been made at step S17, the relay ECU 10 makes affirmative determination at step S20. The relay ECU 10 then makes negative determination at steps S21, S24, and S25, such that the frame 27 that is variable data is not recorded in the cache memory section 106.

In this case 5A, the frame 27 that is freshly generated variable data is transmitted from the fourth ECU 16D to the application AP4 that is the request originator via the relay ECU 10. The application AP4 is thus able to execute processing using the frame 27 that is recorded with data having a utility value.

Case 5B

A case is envisaged in which the transmission request section 101 issues a transmission request to the receiving section 104 at a predetermined first timing under the control of the application AP4 as the request originator, and the transmission request includes ID information for the frame 27 with the ID 180. Moreover, a case is envisaged in which the transmission request section 101 has issued a transmission request to the receiving section 104 at a second timing earlier than the first timing under the control of the application AP1 as the request originator, and this transmission request also included ID information for the frame 27 with the ID 180. Moreover, it is assumed that the frame 27 with the ID 180 which was transmitted from the fourth ECU 16D to the reception section 103 is transmitted from the transmission section 102 to the application AP1 and this frame 27 is recorded in the cache memory section 106.

In this case, at step S14 in FIG. 9, the vehicle determination section 108 of the relay ECU 10 determines whether or not the specific condition relating to the frame 27 with the ID 180 that is the target data is satisfied, based on the two-dimensional map 32. In this example, the vehicle 12 is envisaged to be traveling on a general road on an island surrounded by sea in a particular country. There are no expressways on this island. When an application of the navigation system is being executed, the vehicle determination section 108 identifies that the vehicle 12 is traveling on the general road on the island based on the frame 27 with the ID 150 received from the fourth ECU 16D. In such a case, the vehicle determination section 108 determines the specific condition to be satisfied based on the two-dimensional map 32. Namely, the vehicle determination section 108 makes affirmative determination at step S14. In this case, there is no possibility of the vehicle 12 moving to a road outside of the island or of the vehicle 12 traveling on an expressway. Namely, in this case, there is no possibility of the data content of the frame 27 with the ID 180 which expresses information relating to the speed limit changing.

Next, at step S12 in FIG. 9, the data identification section 105 of the relay ECU 10 determines whether or not this frame 27 has been recorded in the cache memory section 106. In this case, since the frame 27 has been recorded in the cache memory section 106 (step S12: YES), at step S13, the transmission section 102 transmits the frame 27 with the ID 180 recorded in the cache memory section 106 to the application AP4 that is the request originator.

In this case 5B, the application AP4 that is the request originator acquires the frame 27 with the ID 180 from the cache memory section 106. Accordingly, an increase in the communication traffic volume over the in-vehicle network 14 is suppressed. Moreover, considering the vehicle state and the vehicle peripheral environment, the frame 27 (variable data) recorded in the cache memory section 106 is data that has a utility value to the application AP4. The application AP4 is thus able to execute processing using the frame 27 that stores data having a utility value.

As described above based on the respective cases, the cache memory section 106 of the present exemplary embodiment temporarily records transmission request data that is fixed data. The cache memory section 106 also temporarily records target data (transmission request data that is variable data) when the specific condition is satisfied. Accordingly, the request originator does not acquire, from the cache memory section 106, variable data having a long elapsed duration and has no utility value. This enables the chance of the request originator acquiring data that does not have a utility value from the cache memory section 106 to be eliminated.

Moreover, in cases in which the specific condition is satisfied, the transmission section 102 transmits the target data recorded in the cache memory section 106 to the request originator as transmission request data. In cases in which the specific condition is satisfied, the target data has a utility value, irrespective of the length of elapsed duration. This enables the chance of the request originator acquiring data that does not have a utility value from the cache memory section to be eliminated.

In cases in which the specific condition is not satisfied, the cache memory section 106 temporarily records the corresponding frame 27 (target data) that is variable data when the data identification section 105 has determined the elapsed duration to be the corresponding threshold or lower. This target data has a utility value due to the short elapsed duration. This enables the chance of the request originator acquiring data that does not have a utility value from the cache memory section to be eliminated.

Moreover, in cases in which the data identification section 105 determines that the elapsed duration of the transmission request data has exceeded the corresponding threshold, the transmission section 102 transmits transmission request data that has been transmitted from the transmission originator to the reception section 103 to the request originator. This enables the request originator to receive transmission request data that is variable data that has a short elapsed duration and still has a utility value.

In cases in which the transmission request data is any out of fixed data, variable data that satisfies the specific condition, or variable data that does not satisfy the specific condition and has an elapsed duration of the corresponding threshold or lower, the fixed data or variable data recorded in the cache memory section 106 is transmitted to the request originator. Each request originator may, for example, issue transmission requests several dozen times or more per second. Accordingly, were all the transmission request data to be transmitted to the relay ECU 10 by the first ECU 16A, the second ECU 16B, the third ECU 16C, and the fourth ECU 16D, the communication traffic volume over the in-vehicle network 14 would become very high. However, by transmitting fixed data and variable data recorded in the cache memory section 106 to the request originator as in the present exemplary embodiment, such an increase in the communication traffic volume over the in-vehicle network 14 is suppressed.

Although explanation has been given regarding the relay ECU 10, the onboard relay method, and non-transitory recording medium according to the present exemplary embodiment, appropriate design modifications may be made to the relay ECU 10, the onboard relay method, and non-transitory recording medium within a range that does not depart from the spirit of the present disclosure.

The number of ECUs connected to the relay ECU 10 and applications is not limited as long as there is one or more of each.

The present disclosure may be configured such that information is received from satellites of a global navigation satellite system other than GPS (for example, Galileo) to acquire position information of the vehicle 12.

The above-described combinations of at least one of the vehicle state or the vehicle peripheral environment combined with target data that satisfy the specific condition are merely examples, and specific conditions may be satisfied when other combinations are made. For example, a specific condition may be satisfied for predetermined target data when driving support control other than ACC is being executed. Moreover, whether or not such specific conditions are satisfied may be decided based on combinations of a vehicle state and target data. Similarly, whether or not such specific conditions are satisfied may be decided based on combinations of the vehicle peripheral environment and target data.

The fixed data is not limited to the data described above. For example, the fixed data may include information regarding part numbers of vehicle components.

The variable data is not limited to the data described above. For example, the variable data may include information on steering angle of a steering wheel, operation state of an engine (revolution speed, cooling water temperature, and the like), actuation state of a wiper, tire pressure, door open/closed state, control parameter employed in driving support control, and currency.

The cache memory section 106 may be configured by non-volatile memory.

What is claimed is:

1. An onboard relay device, comprising:
a memory; and
a processor coupled to the memory, the processor being configured to:
receive a data transmission request from a request originator that is at least one of one or more electronic control units (ECUs) or one or more application software;
determine whether received data, which is data received from a transmission originator that is at least one ECU other than the request originator, is variable data or fixed data, wherein the variable data is data expressing a variable value with content that changes over time, and the fixed data is data expressing a fixed value with content that does not change over time;
temporarily record the received data in a cache memory section in cases in which the received data is the fixed data;
determine whether or not transmission request data, which is data subject to the data transmission request from the request originator, is recorded in the cache memory section;
in cases in which the processor has determined the transmission request data to be the received data recorded in the cache memory section, transmit the received data recorded in the cache memory section to the request originator as the transmission request data;
determine whether or not a specific condition is satisfied, the specific condition being satisfied in a case in which a predetermined combination has occurred between (i) at least one of a vehicle state and a vehicle peripheral environment and (ii) a type of target data, the target data being the transmission request data comprising the variable data; and
cause the target data to be temporarily recorded in the cache memory section in cases in which determination is made that the specific condition is satisfied.

2. The onboard relay device of claim 1, wherein:
the processor is configured to determine whether or not an elapsed duration, which is a duration from a generation time of the target data to a current time, is a predetermined threshold or lower in cases in which determination is made that the specific condition is not satisfied; and
the processor is configured to cause the target data to be temporarily recorded in the cache memory section in cases in which determination is made that the elapsed duration is the threshold or lower.

3. The onboard relay device of claim 2, wherein, in cases in which determination is made that the elapsed duration has exceeded the threshold, the processor is configured to:
receive the transmission request data from the transmission originator; and
transmit the received transmission request data to the request originator.

4. The onboard relay device of claim 2, wherein, in a case in which the determination is made that the elapsed duration is the threshold or lower, the processor is configured to determine whether or not the target data is recorded in the cache memory section.

5. The onboard relay device of claim 1, wherein the processor is configured to transmit the target data recorded in the cache memory section to the request originator as the transmission request data in cases in which the determination is made that the specific condition is satisfied.

6. The onboard relay device of claim 1, wherein the processor is configured to determine the specific condition to be satisfied for the target data, which is predetermined, in cases in which a vehicle is executing predetermined driving support control.

7. The onboard relay device of claim 1, wherein the processor is configured to determine the specific condition to be satisfied for the target data, which is predetermined, in cases in which a vehicle is traveling in a predetermined time period.

8. The onboard relay device of claim 1, wherein the processor is configured to determine the specific condition to be satisfied for the target data, which is predetermined, in cases in which a vehicle is traveling at high speed on an uncongested expressway.

9. An onboard relay method executed by a processor, the method comprising:
receiving a data transmission request from a request originator that is at least one of one or more electronic control units (ECUs) or one or more application software;
determining whether received data, which is data received from a transmission originator that is at least one ECU other than the request originator, is variable data or fixed data, wherein the variable data is data expressing a variable value with content that changes over time, and the fixed data is data expressing a fixed value with content that does not change over time;
recording the received data in a cache memory section temporarily in cases in which the received data is the fixed data;
determining whether or not transmission request data, which is data subject to the data transmission request from the request originator, is recorded in the cache memory section;
transmitting the received data recorded in the cache memory section to the request originator as the transmission request data in cases in which determination is made that the transmission request data is the received data recorded in the cache memory section,
determining whether or not a specific condition is satisfied, the specific condition being satisfied in a case in which a predetermined combination has occurred between (i) at least one of a vehicle state and a vehicle peripheral environment and (ii) a type of target data, the target data being the transmission request data comprising the variable data; and
causing the target data to be temporarily recorded in the cache memory section in cases in which determination is made that the specific condition is satisfied.

10. A non-transitory recording medium storing a program that is executable by a computer to perform processing, the processing comprising:
receiving a data transmission request from a request originator that is at least one of one or more electronic control units (ECUs) or one or more application software;
determining whether received data, which is data received from a transmission originator that is at least one ECU other than the request originator, is variable data or fixed data, wherein the variable data is data expressing a variable value with content that changes over time, and the fixed data is data expressing a fixed value with content that does not change over time changes;

recording the received data in a cache memory section temporarily in cases in which the received data is the fixed data;

determining whether or not transmission request data, which is data subject to the data transmission request from the request originator, is recorded in the cache memory section;

transmitting the received data recorded in the cache memory section to the request originator as the transmission request data in cases in which determination is made that the transmission request data is the received data recorded in the cache memory section, determining whether or not a specific condition is satisfied, the specific condition being satisfied in a case in which a predetermined combination has occurred between (i) at least one of a vehicle state and a vehicle peripheral environment and (ii) a type of target data, the target data being the transmission request data comprising the variable data; and causing the target data to be temporarily recorded in the cache memory section in cases in which determination is made that the specific condition is satisfied.

* * * * *